(12) United States Patent
Urien

(10) Patent No.: US 8,646,041 B2
(45) Date of Patent: Feb. 4, 2014

(54) METHOD FOR SECURING INFORMATION EXCHANGE, AND CORRESPONDING DEVICE AND COMPUTER SOFTWARE PRODUCT

(75) Inventor: Pascal Urien, Villepreux (FR)

(73) Assignee: Institut Telecom / Telecom Paristech, Paris Cedex (FR)

( * ) Notice: Subject to any disclaimer, the term of this patent is extended or adjusted under 35 U.S.C. 154(b) by 286 days.

(21) Appl. No.: 12/602,000

(22) PCT Filed: May 19, 2008

(86) PCT No.: PCT/EP2008/056136
§ 371 (c)(1),
(2), (4) Date: May 18, 2010

(87) PCT Pub. No.: WO2008/145558
PCT Pub. Date: Dec. 4, 2008

(65) Prior Publication Data
US 2010/0257588 A1    Oct. 7, 2010

(30) Foreign Application Priority Data

May 25, 2007    (FR) ..................................... 07 03743

(51) Int. Cl.
*G06F 15/16*    (2006.01)
*G06F 17/30*    (2006.01)

(52) U.S. Cl.
USPC ........ 726/3; 726/5; 726/7; 713/150; 713/151; 713/152

(58) Field of Classification Search
USPC ................................ 726/3; 713/150–152, 187
See application file for complete search history.

(56) References Cited

U.S. PATENT DOCUMENTS

| | | | |
|---|---|---|---|
| 7,373,500 B2 * | 5/2008 | Ramelson et al. | 713/150 |
| 7,382,882 B1 * | 6/2008 | Immonen | 380/270 |
| 7,451,921 B2 * | 11/2008 | Dowling et al. | 235/380 |
| 8,477,767 B2 * | 7/2013 | Dowling et al. | 370/356 |
| 2002/0138549 A1 | 9/2002 | Urien | |
| 2003/0172090 A1 * | 9/2003 | Asunmaa et al. | 707/200 |
| 2003/0200431 A1 * | 10/2003 | Stirbu | 713/168 |
| 2004/0210663 A1 * | 10/2004 | Phillips et al. | 709/230 |
| 2004/0250059 A1 * | 12/2004 | Ramelson et al. | 713/150 |

(Continued)

FOREIGN PATENT DOCUMENTS

| | | |
|---|---|---|
| EP | 1349032 A1 | 10/2003 |
| WO | 0160040 A2 | 8/2001 |
| WO | 2006021865 A1 | 3/2006 |

OTHER PUBLICATIONS

Badra et al., "Toward SSL Integration in SIM SmartCards," 2004, IEEE, pp. 889-895.*
Berbecaru, Diana, "On Measuring SSL-based Secure Data Transfer with Handheld Device," 2005, IEEE, pp. 409-414.*
Urien et al., "Introducing Smartcard Enabled RADIUS Server," 2006, IEEE, pp. 74-81.*

(Continued)

*Primary Examiner* — Luu Pham
(74) *Attorney, Agent, or Firm* — David D. Brush; Westman, Champlin & Koehler, P.A.

(57) ABSTRACT

A method is provided for producing securing data for implementing a secured session between a first and at least a second entity based on a protocol for establishing secured sessions. The method includes setting up a third secured entity related to the first entity; generating at least a portion of the securing data within the third entity; and transmitting the securing data from the secured third entity to the first entity.

4 Claims, 6 Drawing Sheets

(56) References Cited

U.S. PATENT DOCUMENTS

| | | | |
|---|---|---|---|
| 2005/0060414 A1* | 3/2005 | Phillips et al. | 709/227 |
| 2005/0060427 A1* | 3/2005 | Phillips et al. | 709/238 |
| 2005/0181875 A1* | 8/2005 | Hoehne et al. | 463/41 |
| 2005/0246292 A1* | 11/2005 | Sarcanin | 705/67 |
| 2007/0130617 A1* | 6/2007 | Durfee et al. | 726/5 |
| 2008/0022374 A1* | 1/2008 | Brown et al. | 726/5 |
| 2009/0210347 A1* | 8/2009 | Sarcanin | 705/67 |
| 2011/0158228 A1* | 6/2011 | Dowling et al. | 370/352 |

OTHER PUBLICATIONS

International Search Report dated Jan. 22, 2009 for corresponding International Application No. PCT/EP2008/056136 filed May 19, 2008.

Written Opinion dated Jan. 22, 2009 for corresponding International Application No. PCT/EP2008/056136 filed May 19, 2008.

International Preliminary Report on Patentability dated Apr. 1, 2010 for corresponding International Application No. PCT/EP2008/056136 filed May 19, 2008.

* cited by examiner

METHOD FOR SECURING INFORMATION EXCHANGE, AND CORRESPONDING DEVICE AND COMPUTER SOFTWARE PRODUCT

CROSS-REFERENCE TO RELATED APPLICATIONS

This application is a Section 371 National Stage Application of International Application No. PCT/EP2008/056136, filed May 19, 2008 and published as WO 2008/145558 on Dec. 4, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of the management of data exchanges between two entities in a communication network.

More specifically, the disclosure relates to the securing of such exchanges. Many applications, especially for trading or access to confidential information use the SSL (Secure Socket Layer) or TLS (Transport Layer Security) protocols to exchange data securely. Even though these protocols are mathematically proven, as they are carried out entirely by less secure computer systems, this permits attacks which lower the trust that can be legitimately placed in the exchange procedures that use these protocols.

BACKGROUND OF THE DISCLOSURE

The running of a secure connection between two entities of a communication network passes by the initiation of a secure session based either on the SSL protocol or the TLS protocol.

Consequently, to establish such a session, the two entities use mechanisms that are supposed to ensure that the session created may not be hacked or spied on. Below, the operation of the SSL and TLS protocols will be described. Even though this description is more particularly dedicated to the TLS protocol, it also applies to the SSL protocol.

The TLS protocol is organised on the basis of a set of five software entities which work together, APPLICATION, HANDSHAKE, CCS, ALERT and RECORD. The "APPLICATION" entity refers to a software application that wishes to run a secure communication session (layer 7 of the OSI model). The "HANDSHAKE", "CCS", "ALERT" and "RECORD" entities (also called layers) are entities which are used as part of an application of the TLS protocol, of which a detailed description may be found under the reference "RFC 2246" by the IETF committee ("Internet Engineering Task Force"). Such an application of the TLS protocol is made at level 5 of the OSI model.

The architecture of an OSI stack may be described as follows: the layer managed by the "RECORD" entity (also called "RECORD" layer) transports the messages produced by the "APPLICATION", "HANDSHAKE", "CCS" and "ALERT" entities, by means of a 5 octet header which defines the entity generating the message, the version of the TLS protocol used and the length of the message. The message themselves also contain a header which indicates the type of the message and the length of the associated data. However, the structure of the "APPLICATION" messages is not defined by the TLS standard. Indeed, each application exchanges messages of which the structure is defined by the application protocol, as for the HTTPS (Hypertext Transfer Protocol Secured) protocol.

Consequently, an "APPLICATION" application uses the services offered by the TLS protocol which creates the confidentiality (encryption) of the data transported using the TCP (Transmission Control Protocol) protocol at the transport layer level.

The TLS secured channel is implemented in two steps, a phase for the authentication and calculation of the keys, followed by, if this is successful, a phase where a secured communication channel is used, using the set of keys previously determined.

The entity of the "HANDSHAKE" layer (also called "HANDSHAKE" layer) carries out the authentication and key calculation procedures. There are two authentication modes, the complete mode (called "Full Session") and a rapid mode ("Session Resumption"). These two modes will be described in more detail later.

The "HANDSHAKE" layer negotiates the encoding and integrity algorithms used by the entity of the RECORD layer (also called "RECORD" layer), which are identified by a number called "cipher_suite".

At the end of a successful authentication procedure, the "RECORD" layer determines a value called master_secret. Using two random numbers produced by the client entity (client_random) and the server entity (server_random) it calculates a set of keys (the keys_bloc), used for the encoding and the integrity of the data received and emitted:

$$\text{keys\_block} = \text{PRF}(\text{master\_secret}, \text{"key expansion"}, \text{server\_random}|\text{client\_random});$$

PRF (Pseudo_Random_Function) is a function which generates pseudo random data; the symbol "|" indicates a concatenation operation.

In a simplified manner, the keys_bloc parameter is a couple of two pairs of keys (KcRx, KiRx) and (KcTx, KiTx) used respectively for the encoding (prefix Kc) and the integrity (prefix Ki) of the data received (suffix Rx) and emitted (suffix Tx).

The "CCS" layer (Change_Cipher_Spec) signals the modifications of the security parameters to the "RECORD" entity. It activates the start of the encoding and integrity procedures of the data, using the "keys_bloc" and "cipher_suite" parameters.

The entity of the ALERT layer (also called "ALERT" layer) signals the errors detected by the "HANDSHAKE" entity (in the case of authentication failure), or by the "RECORD" layer (detection of an integrity error, or an end of session).

The "RECORD" layer carries out four types of operations:
  fragmentation of the data into blocks whose maximum size is $2^{14}$ (16,384) octets;
  an optimal compression of the data; this service is generally not carried out;
  a generation of signatures (based on the HMAC algorithm, defined by the RFC 2104);
  enciphering of the data.

The set of parameters required for the operation of the "RECORD" layer is called "security_parameters" and further comprises the values of the "keys_bloc" produced by the HANDSHAKE entity.

The messages exchanged between the application layer and the layer TCP are encrypted and decrypted by the "RECORD" layer using a set of two pairs of keys (KcRx, KiRx) and (KcTx, KiTx) previously described.

The messages received by the "RECORD" layer are encrypted by the key KcRx ({M}KcRx) and given a HMAC(KiRx, M) signature associated to the KiRx key. The latter verifies the HMAC signature and provides the decrypted value to the application layer.

The messages issued by the application layer are encrypted by the "RECORD" layer using the KcTx ({M}KcTx) key and are given a HMAC(M,KiTx) signature associated to the KiTx key.

When the cipher mode is activated, the RECORD layer operates as follows: a "MESSAGE" transmitted/received by an entity such as "HANDSHAKE" or "APPLICATION" is given a header containing three parameters: type, version, length. The complete "MESSAGE", "HMAC signature" and "padding octets" is encrypted using the algorithm negotiated during the authentication phase and a key Kc.

The "HMAC" signature is calculated from the header, the "MESSAGE" and a frame number (seq_num) (initialised at the value 0 and incremented every time the "RECORD" layer is used) according to the following relationship:

$$HMAC(Ki, seq\_num | Type | Version\ Length | MESSAGE)$$

As previously mentioned, there are two modes for opening a TLS session called "Full Session" and "Session Resumption".

Therefore, for example, in the case where a "Full Session" is opened, using the RSA algorithm, with mutual authentication ("Client Authentication Handshake"), between a client entity and a server entity, the client entity initiates the latter by a "ClientHello" message. The server entity responds with a set of "ServerHello", "Certificate", CertificateRequest", "ServerHelloDone" messages. The client entity then sends the "Certificate", "CertificateVerify", "ClientKeyExchange", ChangeCipherSpec", and "Finished" messages.

In this procedure the client entity verifies the validity of the certificate of the server, by extracting its public RSA key, then sends to it an encrypted value called "pre_master_secret" of this key. The "master_secret" is calculated from the "Client-Random", "Server-Random" and "pre-master-secret" elements. The "CertificateVerify" message contains a signature made using the private RSA key of the client, which proves the identity of the latter (its certificate in the "Certificate" message).

At the end of this authentication procedure, the client entity and the server entity have a new "master_secret" value from which the keys of the "keys_bloc" are deduced. A "SessionID" parameter sent within the "ServerHello" message provides an index of the "master_secret". Then the data generated by the "APPLICATION" layer is transported by the "RECORD" entity, which guarantees the confidentiality and the integrity via the Kc and Ki keys.

When a "Session Resumption" session is opened, a previous "Full Session" procedure has already computed a "master_secret" identified by a "SessionID" index to be obtained. The authentication phase is simplified and consists for the two parties (the client entity and the server entity) of proving their knowledge of the "master_secret" value. The client entity opens the TLS session with a "ClientHello" message containing the index ("SessionID") of a previous session. The server entity responds with a set of messages "ServerHello", "ChangeCipherSpec", and "Finished". It indicates the resumption of the session by inserting a "SessionID" value into the "ServerHello" message that is identical to that contained in the "ClientHello" message. The client entity then provides the "ChangeCipherSpec", and "Finished" messages.

The "master_secret" is not recalculated, however a new "keys_bloc" set is obtained from the "master_secret", "ClientRandom" and "ServerRandom" elements by applying the following function:

$$Keys\_block = PRF(master\_secret, "key\_expansion", server\_random | client\_random).$$

Subsequently, the data generated by the "APPLICATION" layer is transported by the "RECORD" entity, which guarantees the confidentiality and the integrity by means of the keys Kc and Ki.

The "Session Resumption" mechanism simplifies the exchange of information in a TLS session. A first "Full Session" makes the single or mutual authentication of the two ends (client and server) and creates a "master_secret". The following sessions, based on the "Session Resumption" mechanism re-use the "master_secret" to calculate new encoding and integrity keys.

Having described the mechanisms for establishing a TLS session, two steps are highlighted for the secured exchange of information:

an authentication step permitting the master_secret to be obtained and the calculation of the session keys (keys_bloc); and a step for transferring the information protected by the "RECORD" layer in encoded mode.

Even though applications data is exchanged between the client and server entities, the authentication phase is the most critical process as it establishes the identity of the two parties, verifies their certificates and calculates the cryptographic keys.

One disadvantage of this technique of the prior art is related to the fact that the TLS stack (which is to say the sequence of the steps leading to the exchange of information) is entirely executed on the same computer and consequently does not permit the authentication and information exchange procedures to be separated.

Consequently there is no guarantee that the computer on which this TLS stack is executed is entirely secured and that an usurpation of keys may occur during the critical protected authentication and transfer of information phases.

Whereas many applications, for example virtual networks (VPN) based on SSL/TLS, calculation grids or overlay type networks, need specific security guarantees, in order to prevent usurpations of identity, which is to say the unauthorised use of services by computer hackers.

The complex operating systems of computers today permit the execution of malicious software such as Trojan horses, worms and viruses, which are capable of collecting the identities and RSA keys of the users.

To overcome these problems, many solutions have been proposed especially based on chip cards or external devices which contain proof of the physical identity of the user or the machine that wishes to establish a secured session (notably by the storage, on the chip card of private and public keys). Such solutions effectively permit the identity of the entity that wishes to connect to be ensured, but in no way secure the machine on which the authentication procedure is carried out.

SUMMARY

An aspect of the disclosure relates to a method for producing securing data, for implementing a secured session between a first and at least a second entity, based on a protocol for establishing secured sessions. According to an illustrative embodiment of the invention, the method comprises:
- a step of setting up a third secured entity, related to said first entity;
- a step of generating at least a portion of said securing data within said third entity;
- a step of transmitting said securing data from said secured third entity to said first entity.

Therefore, differently from the techniques of the prior art which only permit session data to be produced on the entity that will effectively implement the secured session, an embodiment of the invention authorises the production of such data in a third entity that is different from the first. This third entity may be attached either mechanically to the first, or by means of a network interface, such as a local network. The data for implementing the secured session is therefore no longer generated by the entity which implements the secured session, but by a third party entity, thus avoiding the different attacks that may be made on the first entity.

The method according to an embodiment of the invention thus allows the first entity to be replaced when the secured sessions data is produced. Such a substitution authorises at least part of the operations for defining the data to establish the session to be carried out in the third entity which may therefore take the place of the first and thus secure the data creation procedure in a safe environment.

According to one original embodiment of the invention, said third entity is a "JavaCard" type chip card.

Consequently, an embodiment of the invention allows the device that implements the security protocol to be dissociated from the device that wishes to obtain a secured connection. Furthermore, the use of a "JavaCard" type chip card ensures that this entity responsible for implementing the security protocol is inviolable and totally secured. An additional level of security, issued from work carried out by the inventors, is therefore added to the rest of the security protocol.

According to one specific feature of an embodiment of the invention, said protocol for establishing secured sessions is the SSL protocol.

Consequently, an embodiment of the invention is responsible for establishing a secured session respecting the SSL protocol, which is one of the major protocols in this field.

According to one specific feature of an embodiment of the invention, said protocol for establishing secured sessions is the TLS protocol.

Consequently, an embodiment of the invention is responsible for establishing a secured session respecting the TLS protocol, which is one of the most commonly used protocols in this field.

According to one specific embodiment of the invention, said production method further comprises:
- a step of transmitting, by said first entity, at least one message destined to a "RECORD" layer used in said third entity;
- a step of receiving, by said first entity, at least one message from said "RECORD" layer;
- a step of calculating a set of keys by said third entity;
- a step of collecting said set of keys available by said first entity from said third entity;
- a step of recovering a secured communication session identifier.

Consequently, an embodiment of the invention permits the conformity of the existing installations to be maintained by transferring messages instead and in place of executing production steps on the first entity, which may be subject to attacks.

The disclosure also concerns a device for producing securing data, for implementing a secured session between a first and at least a second entity, based on a protocol for establishing secured sessions. According to an embodiment of the invention, such a device comprises:
- means of setting up, attached to said first entity;
- means of generating at least part of said securing data;
- means of transmitting said securing data to said first entity.

In general, such a device comprises means which allow it to implement the steps of the production method as previously described.

According to one original embodiment of the invention, said means of generating and said means of transmitting are grouped together on a chip card. Consequently, such a device according to an embodiment of the invention has means of resisting malicious attacks.

In another embodiment, the invention also relates to a computer program that may be downloaded from a communication network and/or stored on a support that may be read by a computer and/or executed by a microprocessor.

According to an embodiment of the invention, such a computer program comprises program code instructions to execute the production method as previously described.

BRIEF DESCRIPTION OF THE DRAWINGS

Other features and advantages will become clearer upon reading the following description of a preferred embodiment, provided purely by way of example and in no way restrictively, and the appended drawings, among which.

DETAILED DESCRIPTION OF ILLUSTRATIVE EMBODIMENTS

1. Reminder of the Principle of an Embodiment of the Invention

An embodiment of the invention therefore permits the problems related to the insecurity intrinsic to the entities on which the protocols SSL and TLS are implemented to be resolved. Indeed, these entities are, in general, servers which use operating systems that are proprietary or from freeware or personal computers of classic users. If a considerable amount of trust is placed most of the time in the category of the "servers", the personal computers of individual users do not have the same level of security as the servers and are therefore more often (but not exclusively) subject to the risks of attacks. Consequently, even when communication session security protocols such as TLS and SSL perform their functions correctly, it is quite probable that an attack targeting a work station or a server entity using malicious software may infiltrate a "software stack" or modify operating system files. Such an infiltration is in this case carried out in the aim of taking control of subsequent sessions set up by users.

To avoid these subsequent attacks, an embodiment of the invention permits the implementation of at least certain authentication steps in a third party entity that is attached to the entity that generally implements this authentication phase. Such a third party entity, which is a device for producing securing information according to an embodiment of the invention, is also called "security module". This entity then makes available the information required to continue the authentication session.

Such information may for example, be the session keys (keys_bloc) or the "master_secret" (according to the level of security required) for a software program that requires a secured exchange of information by the SSL/TLS protocols.

The general principle of an embodiment of the invention is based on the relocation, within a trusted entity, such as a security module, of at least certain steps of a protocol, such as an authentication protocol, to be implemented.

Indeed, even though applications data is exchanged between the client and server entities, the authentication phase is the most critical process as it establishes the identity of the two parties, verifies their certificates and calculates the cryptographic keys.

An embodiment of the invention is remarkable compared to the techniques of the prior art, which use chip cards, in that these prior mechanisms do not propose, in the card in question, the execution of software, but simple storage of data such as the certificates or keys. An entity according to an embodiment of the invention, on the contrary, does not contain, in its first function, data, but a set of mechanisms permitting the execution, independently, of at least certain steps of a secured protocol.

Figure 1:
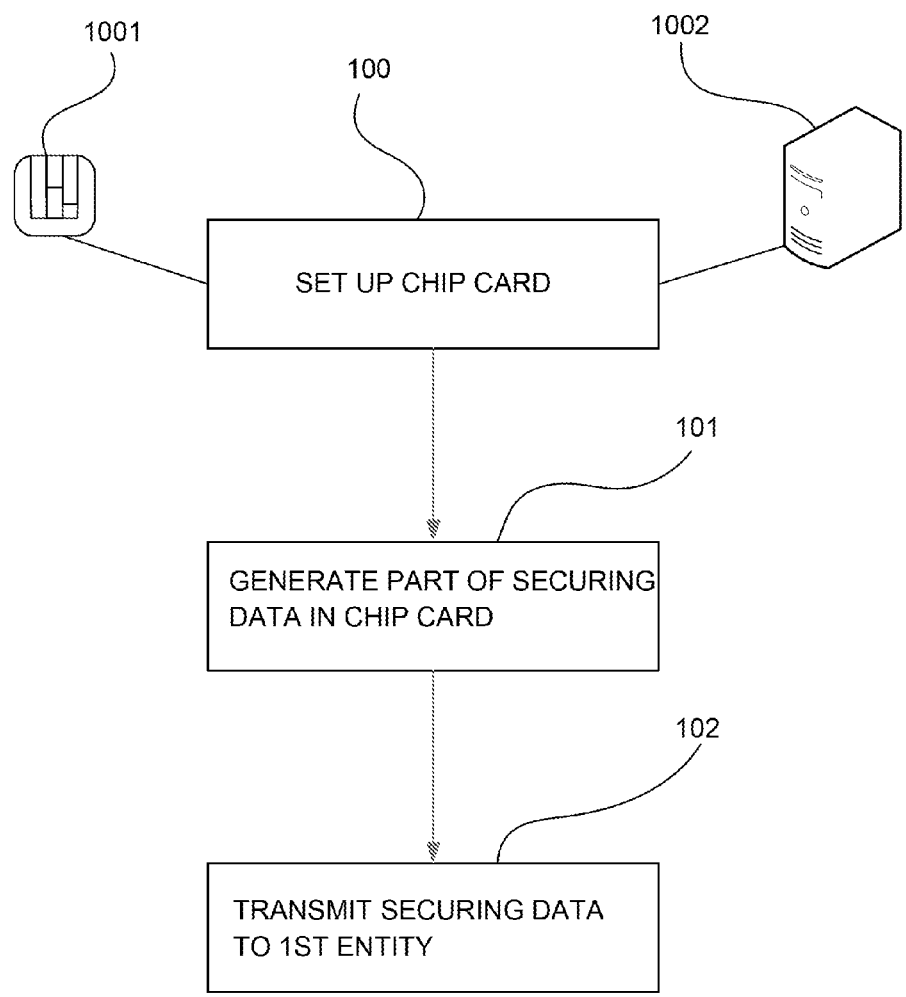
FIG. 1 shows a block diagram of the method of producing secured data according to an embodiment of the invention.

In relation to FIG. 1, the method of producing secured data according to an embodiment of the invention will now be presented. It comprises:
- a step of setting up (100) the security module (for example a chip card), attached to a first entity (for example a personal computer);
- a step of generating (101) part of the securing data within the security module;
- a step of transmitting (102) securing data from the security module to the first entity.

In the following description, the case of a security module using the method according to an embodiment of the invention for the authentication steps of the SSL/TLS protocols is especially presented. It is however clear that one or more embodiments of the invention is not restricted to this specific application, but may be used in many other fields, and for example in entities which may use mechanisms for setting up or starting other entities, such as vehicles for example and more generally in all cases where the advantages procured by an embodiment of the invention are of interest.

2. Description of an Embodiment

In this embodiment, the implementation of method according to the invention in a chip card containing means of executing computer programs (security module) will be presented. This may for example be a "JavaCard" which is to say a chip card which contains a virtual Java machine. Such chip cards have the advantage of being resistant to attacks. This means that these cards have the physical features which drastically reduce the risks and possibilities of hacking. They are therefore particularly suited for the implementation of secured procedures.

In this embodiment, the method according to the invention permits the implementation of the SSL or TLS protocol to be relocated within this security module.

In the prior art, the TLS stack (which is to say the sequence of the steps of the process leading to the authentication) is entirely executed on the same computer and does therefore not permit the authentication and information exchange procedures to be separated.

However many applications, for example virtual networks (VPN) based on a SSL/TLS protocol, calculation grids or "overlay" type networks, need specific security guarantees, to prevent usurpations of identity, which is to say the unauthorised use of services by hackers. The complex operating systems of computers today permit the execution of malicious software such as Trojan horses, worms and viruses, capable of collecting the identities and RSA keys of the users.

A security module implementing the method according to an embodiment of the invention thus comprises original functions which allow it to carry out the authentication phase of the TLS protocol, and to transfer the right, to an application, to use the secured tunnel that has been created beforehand.

A security module implementing the method according to an embodiment of the invention carries out client or TLS server entity functions. Consequently, in this specific embodiment, the method according to the invention implements les HANDSHAKE", "ALERT", "CCS" and "RECORD" entities previously described.

Figure 2:
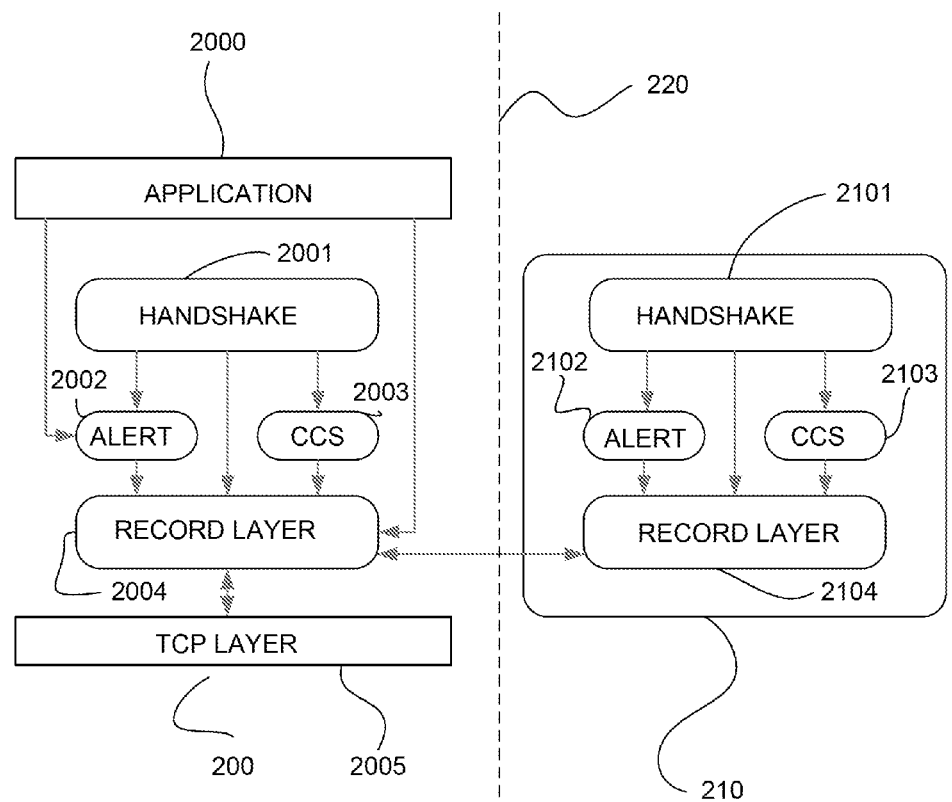
FIG. 2 illustrates an example of implementing the production method in a security module according to an embodiment of the invention.

In relation to FIG. 2, a security module (210) is presented which uses the TLS protocol according to the production method of an embodiment of the invention and a user entity (200), which is to say an application (2000) comprising a sub-set of the TLS stack, which is to say obligatorily the RECORD" (2004) and "ALERT" (2002) layers and optionally the CCS" (2003) and "HANDSHAKE" (2001) layers. The "RECORD" layer (2004) has a communication interface with the "TCP" (2005) layer.

In this embodiment, such a security module offers a functional interface (220) which comprises eight commands: "SET-Credentials", Start", "Process-TLS", "GET-Keys_bloc", "Compute-Keys_bloc", "GET-Cipher_suite", "GET-SessionID", "GET-Master_secret". Such commands may be carried out by following the ISO 7816 standard according to coding commonly called "APDUs" ("Application Protocol Data Unit" (PDU) of the layer seven (Application) of the OSI model").

The security module (210) which implements the production method according to an embodiment of the invention comprises the entities required to implement the securing method which is to say the "RECORD" (2104) and "ALERT" (2102) layers and optionally the "CCS" (2103) and "HANDSHAKE" (2101) layers.

The functional interface (220) permits the user entity (200) to call the security module (210) for the production of securing data.

3. Description of the Commands 3.1 Command SET-Credentials

The role of the module, which is to say its client or server entity behaviour as well as the different parameters required for its operation, usually qualified with credit letters or "credentials" (X509, RSA private key) certificates is activated by the command SET-Credentials( ),
  SET-Credentials(Credentials, Role)

3.2 Start (Unix-Time)

In this embodiment, a "Start" command sets up a TLS session; as the security modules do not have a clock in general, it also provides the time in GMT in the UNIX format, which is to say a 32 bit number which measures the number of seconds that have passed since 1 Jan. 1970.

3.3 Process-TLS

The TLS packets, which is to say the messages produced by the RECORD entity, are transmitted to the security module using the Process_TLS (Record-Packets) command which returns one or several RECORD messages.

Record-Packets=Process-TLS(Record-Packets)

3.4 GET-Keys_Bloc

When a TLS security module has successfully carried out the authentication of its correspondent, it calculates the keys_bloc, the RECORD layer switches to coded mode, and supplies the CCS and FINISHED messages. The GET-Keys_bloc command then collects all of the keys available, keys_bloc=GET-Keys_bloc( )

The user of the security module services may then manage autonomously (without the security module) its own RECORD layer. Indeed, as it knows the keys of the secured channel (keys_bloc) and the current value of the parameter seq_num is equal to 1 (the value 0 is used to calculate the HMAC integrity of the FINISHED message).

3.5 Compute-Keys_Bloc

The Compute-Keys_bloc( ) command associated to the random numbers generated by the client entity and the server entity (Client-Random and Server-Random) permits the "keys_bloc" parameter to be calculated. It is useful in a "Session Resumption" type session, where the user of the security module only uses the latter to obtain the keys_bloc.

keys_bloc=Compute-Keys_bloc(Client-Random, Server-Random)

It is important to observe that in this case the security module does not export the value of the "master_secret". It is therefore impossible to carry out a "Session Resumption" type session in the absence of the security module, which thus guarantees the good faith of the user of the service.

3.6 GET-Cipher_Suite

A GET-Cipher_suite command allows the security parameters to be identified, indexed by the cipher_suite number, associated to the RECORD entity.

cipher_suite=Get-Cipher_suite( )

3.7 GET-SessionID

The GET-SessionID command returns the "SessionID" parameter associated to the current session or to the previous session. This is useful information for the user who wishes to manage partially a "Session Resumption".

SessionID=GET-SessionID( )

3.8 GET-Master_Secret

The GET-Master_secret( ) command collects the "master_secret" associated to the "SessionID" of the current or previous session. It is optional and corresponds to a policy for managing the "Session Resumption" for which the user does not use the service of calculating the "keys_bloc".

master_secret=GET-Master_secret( )

4. Implementations of the Protocol

Using the eight commands described above, it is possible to implement at least three main modes of use, by a user, from a TLS security module.

Figure 3:
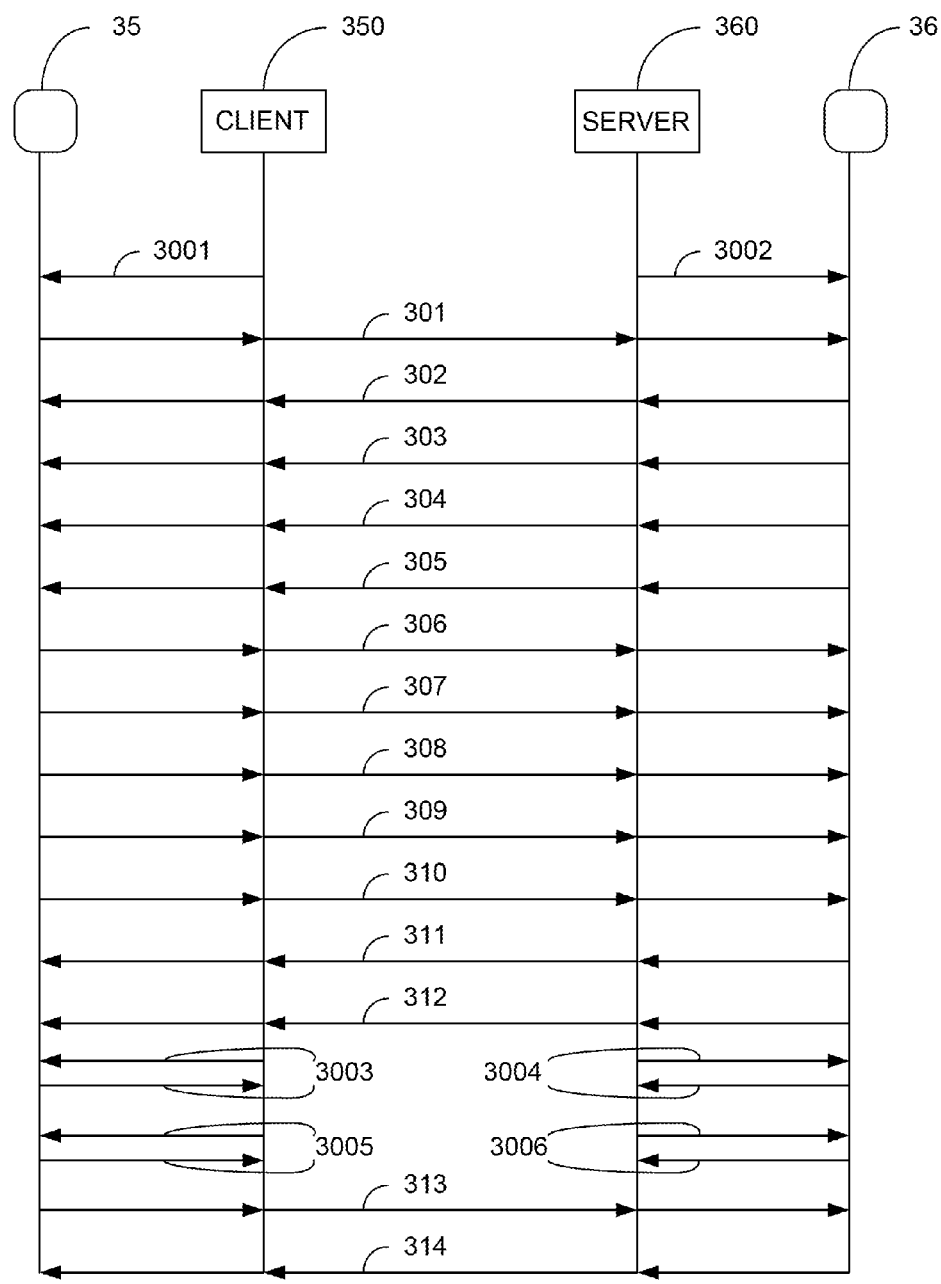
FIG. 3 describes a means of implementing the production method by two entities using two security modules in a "full session" mode.

A first mode is illustrated in FIG. 3. This shows the implementation of the method according to an embodiment of the invention applied to the opening of a session in "full session" mode using the RSA algorithm, with mutual authentication ("Client Authentication Handshake"). A client entity (350) sets this up by a ClientHello (301) message. A server entity (360) responds with a set of messages ServerHello (302), Certificate (303), CertificateRequest (304) and ServerHello Done (305). The client entity then provides the messages Certificate (306), CertificateVerify (307), ClientKeyExchange (308), ChangeCipherSpec (309), and Finished (310).

In this procedure the client entity verifies the validity of the certificate of the server, extracts its RSA public key, then sends it a coded value called pre_master_secret of this key. The master_secret is calculated from the Client-Random, Server-Random and pre-master-secret elements. The CertificateVerify (307) message contains a signature made with the RSA private key of the client, which proves the identity of the latter (its certificate is present in the Certificate (306) message).

At the end of this authentication procedure, the client entity and the server entity have a new master_secret value from which are deduced the keys of the keys_bloc. A SessionID parameter sent in the ServerHello message provides an index of the master_secret. Then the data generated by the application layer is transported by the RECORD (313) (313) entity, which ensures the confidentiality and the integrity by means of the keys Kc and Ki.

The steps described above are implemented in security modules: one for the client entity (35) and one for the entity server entity (36). Consequently, as is shown in FIG. 3, the steps described above are not implemented in client (350) entities and server (360) entities but only pass via these entities). The effective implementation is made within the security modules using the commands of the functional interface of the module.

In each of the two security modules implemented, four commands are used: "Start" (3001, 3002) to set up a TLS session, "Process-TLS" processes the TLS packets (not shown), "GET_keys_bloc" (3003, 3004) collects the keys of the RECORD layer and "GET_Cipher_suite" (3005, 3006) indicates the list of cryptographic algorithms used to manage the secured channel. The client entity opens a TLS session with a server entity typically listening on the port TCP 443. In this illustration, a security module is implemented on the client entity (350) side and on the server entity (360) side.

Figure 4:
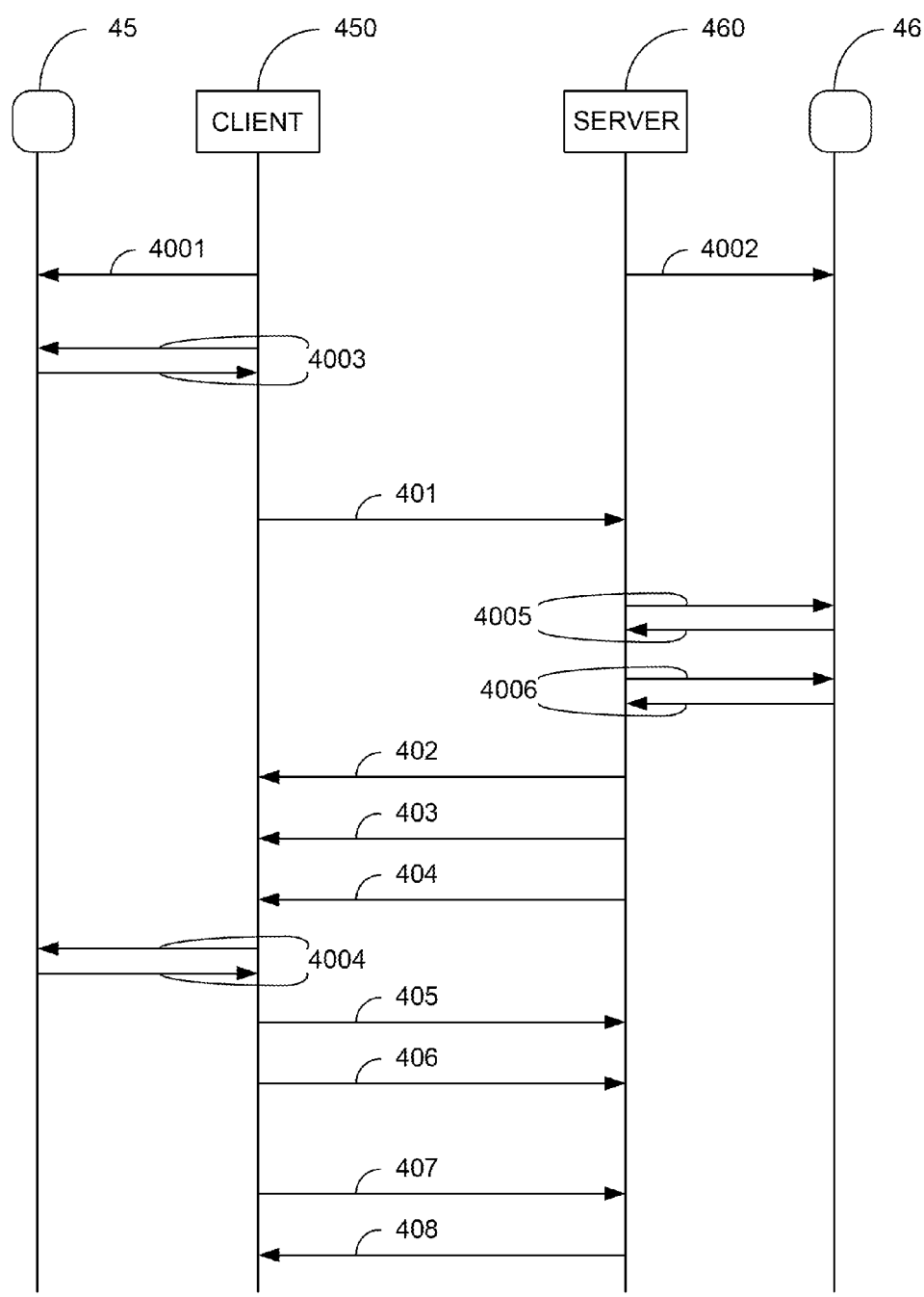
FIG. 4 describes a means of implementing the production method by two entities using two security modules in a "Session Resumption" mode.

A second mode is shown in FIG. 4. In this case, a previous "Full Session" type session has allowed a "master_secret" identified by a "SessionID" index to be obtained. The authentication phase is simplified and consists for the two parties (client entity and server) of proving their knowledge of the master_secret value. The client entity (440) opens the TLS session by a ClientHello (401) message containing the index (SessionID) of a previous session. The server entity (460) responds with a set of messages "ServerHello" (402), "ChangeCipherSpec" (403), and "Finished" (404). It indicates the resumption of the session by inserting a "SessionID" value in the "ServerHello" message identical to that contained in the "ClientHello" message. The client entity then sends the "ChangeCipherSpec" (405), and "Finished" (406) messages.

The "master_secret" is not recalculated, however a new "keys_bloc" set is obtained from the "master_secret", "ClientRandom" and "ServerRandom" elements.

Keys_block=*PRF*(master_secret,"key expansion", server_random client_random).

Then the data generated by the APPLICATION layer is transported by the RECORD (407) (408) entity, which ensures the confidentiality and the integrity by means of the keys Kc and Ki.

The "Session Resumption" mechanism simplifies the exchange of information during a TLS session. A first Full Session makes the single or mutual authentication of the two ends (client entity and server) and produces a master_secret. The following sessions, based on the mechanism of resuming the session re-use the master_secret to calculate new encoding and integrity keys.

In this embodiment, a "Session Resumption" type session is negotiated between a client entity and a server entity. The value of the "master_secret" is protected by the security module on the client entity and/or server side.

Three commands are required: "Start" (4001, 4002) sets up a security module; "GET-SessionID" (4003, 4005) recovers the "SessionID" of a previous session which may be inserted into the "Client-Hello" (4001) message or permit the verification of the existence of a "master_secret" on the server side (4003); "Compute-Keys_bloc( )" calculates the "keys_bloc" using random numbers exchanged by the client entity (4004) and the server entity (4006).

Figure 5:
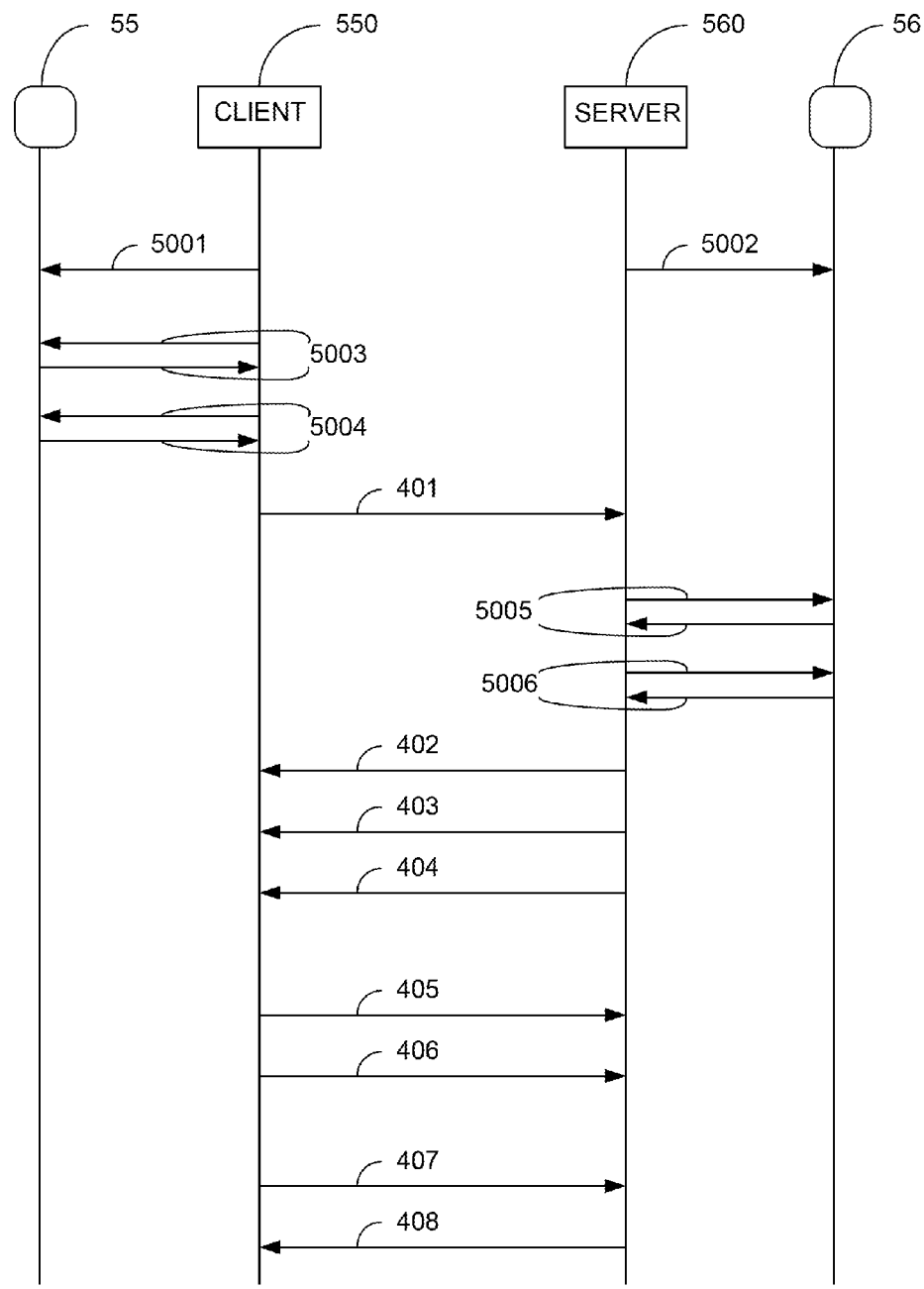
FIG. 5 also describes a means of implementing the production method by two entities using two security modules in a "Session Resumption" mode.

A third mode is explained in FIG. 5. A "Session Resumption" type session is negotiated between a client entity (550) and a server entity (560). The value of the "master_secret" is stored by the security module on the client (55) and/or server (56) side.

Three commands are required; "Start" (5001, 5002) sets up a security module; "GET-SessionID" recovers the "SessionID" of a previous session which may be inserted into the "ClientHello" (5003) message or permit the verification of the existence of a "master_secret" on the server side (5005). "GET-Master-secret" returns the value of the "master-secret" (5004, 5006). This mode of operation is compatible with software such as "OpenSSL" which uses the "SESSION" objects stored in files. In this case, the security module plays the role of a removable cache for the "master_secret" value. Steps 401 to 408 are identical to that described in relation to FIG. 4.

5. Description of a Security Module According to an Embodiment of the Invention

Figure 6:
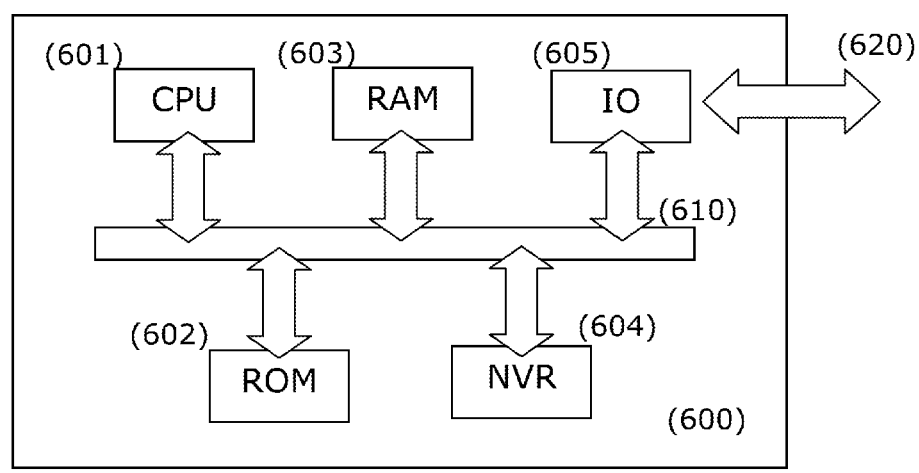
FIG. 6 describes the architecture of a device for producing securing data, also called security module.

In relation to FIG. 6, a security module is shown in the form of a silicon integrated circuit (600), usually called a "Tamper Resistant Device", such as for example the component ST22 (produced by ST Microelectronics) and available in different formats such as PVC cards (chip cards, SIM cards . . . ) integrated into USB sticks, or MMC (MultiMedia Card) memories.

Such a security module incorporates all of the secured data storage means, and also permits software to be executed in a safe, protected environment.

More precisely, it features a CPU (601), a ROM memory which stores the code of the operating system (602), the RAM memory (603), and a non volatile memory (NVR, 604), used as a storage device analogous to a hard drive, and which contains for example integrated TLS software. A system bus (610) connects the various parts of the secured module. The interface with the outside world (620) is provided by an IO inlet/outlet port (605), compliant with standards such as IS06816, USB, USBOTG, IS06816-12, MMC, IEEE 802.3, IEEE 802.11, etc.

The JAVA chip cards, commonly called JAVACARDs, are a specific class of security module.

Although the present disclosure has been described with reference to one or more examples, workers skilled in the art will recognize that changes may be made in form and detail without departing from the scope of the disclosure and/or the appended claims.

The invention claimed is:

1. A method for producing securing data, for implementing a secured session between a first and at least a second entity, according to a protocol for establishing secured sessions, said method comprises:
    setting up, by said first entity, a secured chip card linked to said first entity for establishing a secure session according to a Secure Sockets Layer (SSL) or Transport Layer Security (TLS) protocol;
    generating at least a portion of said securing data, within said secured chip card, from commands transmitted by said first entity;
    transmitting said securing data from said secured chip card to said first entity; and
    setting up said secured session between said first and said at least second entity with said securing data previously transmitted, which comprises executing software in the secured chip card to implement a part of an authentication protocol within the secured chip card with respect to said second entity, and
    wherein said step of generating, within said secured chip card, comprises:
    transmitting, by said first entity, at least one message destined to a "RECORD" layer used in said secured chip card, by using a command implemented in said chip card and transmitted by said first entity;
    receiving, by said first entity, at least one message from said "RECORD" layer;
    calculating a set of keys by said chip card;
    collecting said set of keys available by said first entity from said secured chip card; and
    recovering a secured communication session identifier.

2. The method according to claim 1, wherein said secured chip card comprises a virtual machine.

3. A chip card for producing securing data, for implementing a secured session between a first and at least a second entity, according to a protocol for establishing secured sessions, the device comprises:
    means for setting up the chip card, under control by said first entity, said chip card being linked to said first entity for establishing a secure session according to a Secure Sockets Layer (SSL) or Transport Layer Security (TLS) protocol;
    means for generating at least part of said securing data, from commands transmitted by said first entity;
    means for transmitting said securing data to said first entity; and
    means for executing a part of an authentication protocol within the secured chip card using said securing data with respect to said second entity, and
    wherein said means for generating comprise:
    means for receiving, from said first entity, at least one message destined to a "RECORD" layer used in said secured chip card, by using a command implemented in said chip card and transmitted by said first entity;
    means for transmitting, to said first entity, at least one message from said "RECORD" layer;
    means for calculating a set of keys by said chip card;
    means for transmitting said set of keys available to said first entity; and
    means for recovering a secured communication session identifier.

4. A non-transitory computer readable storage medium, which comprises program code instructions stored thereon which when executed on a computer, execute a method for producing securing data, for implementing a secured session between a first and at least a second entity, according to a protocol for establishing secured sessions, the method comprises:

setting up, under control by said first entity, a secured chip card that is linked to said first entity for establishing a secure session according to a Secure Sockets Layer (SSL) or Transport Layer Security (TLS) protocol;

generating at least a portion of said securing data within said secured chip card, from commands transmitted by said first entity;

transmitting said securing data from said secured chip card to said first entity; and setting up said secured session between said first and said at least second entity with said securing data previously transmitted, which comprises executing software in the secured chip card to implement a part of an authentication protocol within the secured chip card with respect to said second entity, and wherein said step of generating comprises:

receiving, from said first entity, at least one message destined to a "RECORD" layer used in said secured chip card, by using a command implemented in said chip card and transmitted by said first entity;

transmitting, to said first entity, at least one message from said "RECORD" layer;

calculating a set of keys by said chip card;

transmitting said set of keys available to said first entity; and recovering a secured communication session identifier.

* * * * *

UNITED STATES PATENT AND TRADEMARK OFFICE
CERTIFICATE OF CORRECTION

PATENT NO. : 8,646,041 B2  
APPLICATION NO. : 12/602000  
DATED : February 4, 2014  
INVENTOR(S) : Pascal Urien Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 522 days.

Signed and Sealed this

Twenty-ninth Day of September, 2015

Michelle K. Lee
*Director of the United States Patent and Trademark Office*